R. R. ZELL.
Assignor, by mesne assignments, to the SAFETY STEAM GENERATOR COMPANY.
SECTIONAL STEAM BOILER.
No. 10,695. Reissued Mar. 2, 1886.
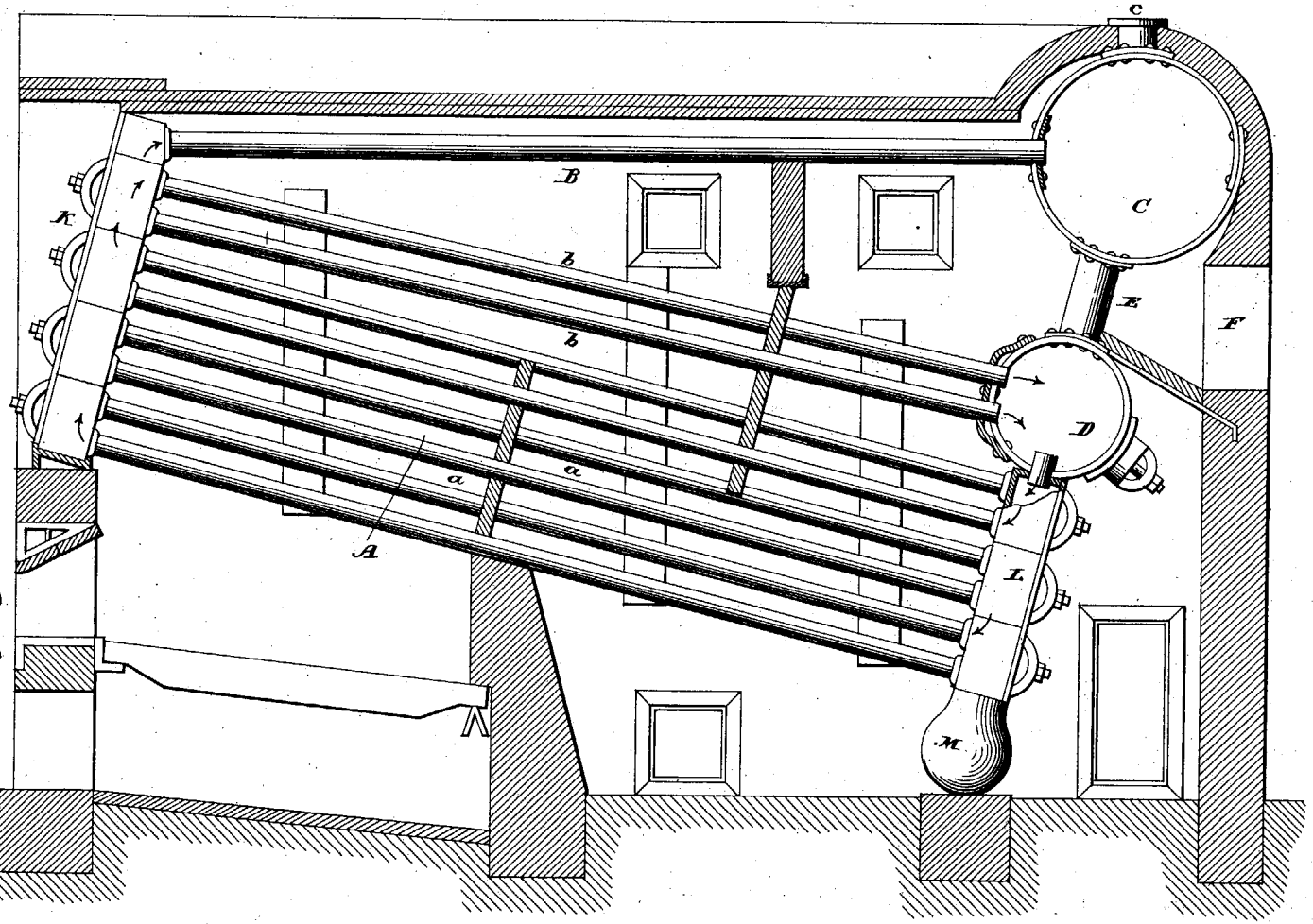
Attest:
Court, A. Cooper,
J. Campbell.
R. R. Zell Inventor:
By
Dickerson, Foster + Lemna.
Attys.
N. PETERS, Photo-Lithographer, Washington, D. C.

UNITED STATES PATENT OFFICE.

ROBERT R. ZELL, OF ESSEX, N. J., ASSIGNOR, BY MESNE ASSIGNMENTS, TO THE SAFETY STEAM GENERATOR COMPANY, OF NEW YORK, N. Y.

SECTIONAL STEAM-BOILER.

SPECIFICATION forming part of Reissued Letters Patent No. 10,695, dated March 2, 1886.

Original No. 304,890, dated September 9, 1884. Application for reissue filed February 3, 1886. Serial No. 190,728.

*To all whom it may concern:*

Be it known that I, ROBERT R. ZELL, a citizen of the United States, and a resident of Essex, in the county of Essex and State of New Jersey, have invented certain new and useful Improvements in Sectional Steam-Boilers; and I do hereby declare that the following is a full, clear, and exact description of the invention, which will enable others skilled in the art to which it appertains to make and use the same, reference being had to the accompanying drawing, which forms a part of this specification.

My invention has relation to improvements in that class of boilers or steam-generators which are known as "sectional boilers" or "safety-boilers;" and it consists in the combination, with the steam-drum and the inclined water-tubes, of an intermediate drum, which receives the water carried over by the steam into the steam-drum and conducts it back into the "headers" or castings which form the rear water-leg of the boiler, and from which the water is fed back into the inclined water-tubes.

In the accompanying drawing, A denotes the inclined water-tubes, which are arranged in two series, the tubes of the lower series, *a*, communicating at their rear ends with the headers or boxes which form the water-leg L, while the tubes of the upper series, *b*, are placed at an incline relative to those of the lower series, and enter with their rear ends into the collecting-drum D. The front headers or boxes of the two series of inclined water-tubes *a* and *b*, which constitute the front leg, K, communicate with the front end of a series of horizontal tubes, B, the rear ends of which are inserted into and secured to the side of the steam-drum C above the water-line. The bottom of the steam-drum C is connected to the top of the collecting-drum D by a short tube, E, and the lower end of the rear water-leg, L, is connected to the usual mud-drum, M. Suitable partitions extend across the entire series of tubes, as usual in steam-generators of this type, for the purpose of compelling the flames and products of combustion from the furnace to traverse the entire series of tubes upward, downward, and again upward before reaching the flue or chimney through the aperture F, and the furnace is constructed with the usual bridge-wall to deflect the draft up between the tubes.

The operation of the boiler is as follows: The two series *a* and *b* being filled with water, which circulates as indicated in the arrows, the steam generated therein will ascend through the front leg, K, up into the horizontal tubes B, where it is superheated before entering the drum C, from which it is discharged or fed to the cylinders of the engine through the outlet *c*. The water which is carried over by the steam into the drum C collects in the bottom of the same, and runs through tube E down into the collecting drum or receiver D, from which it is fed back into the rear water-leg, L, and into the lower series, *a*, of the inclined water-tubes. As the uppermost series of inclined tubes, *b*, connect with drum D and discharge the hot water into the same, a constant circulation will be maintained, as denoted by the arrows, through said tubes *b*, collecting-drum D, leg L, inclined tubes *a*, and the front leg, K, so that the water which collects in drum D from the upper steam-drum, C, is promptly circulated through the lowermost series of inclined tubes. It will thus be seen that water cannot collect in drum D, so as to rise up through the tube E into the steam-drum C, the steam-drum being always clear of water and filled with steam only, regardless of the quantity of condensed steam or water which is discharged into it through the superheating-pipes B.

Having thus described my invention, I claim and desire to secure by Letters Patent of the United States—

1. In a sectional steam-boiler, the combination of the lower series of inclined water-tubes, *a*, upper series of inclined water-tubes, *b*, horizontal steam-tubes B, water-legs K and L, steam-drum C, connecting-tube E, and collecting-drum D, connected on one side to the upper series of inclined tubes, *b*, and at the bottom to the rear water-leg, L, substantially as and for the purpose set forth.

2. In a sectional steam-boiler, the combination of the lower series of water-tubes, *a*, upper series of water-tubes, *b*, steam-tubes B, water-legs K and L, steam-drum C, connecting-tube E, and collecting-drum D, connected on one side to the upper series of tubes, *b*, and at the bottom to the rear water-leg, L, substantially as and for the purpose set forth.

In testimony that I claim the foregoing as my own I have hereunto affixed my signature in presence of two witnesses.

ROBERT R. ZELL.

Witnesses:

GEO. H. EVANS,

WM. A. POLLOCK.